Patented Oct. 24, 1922.

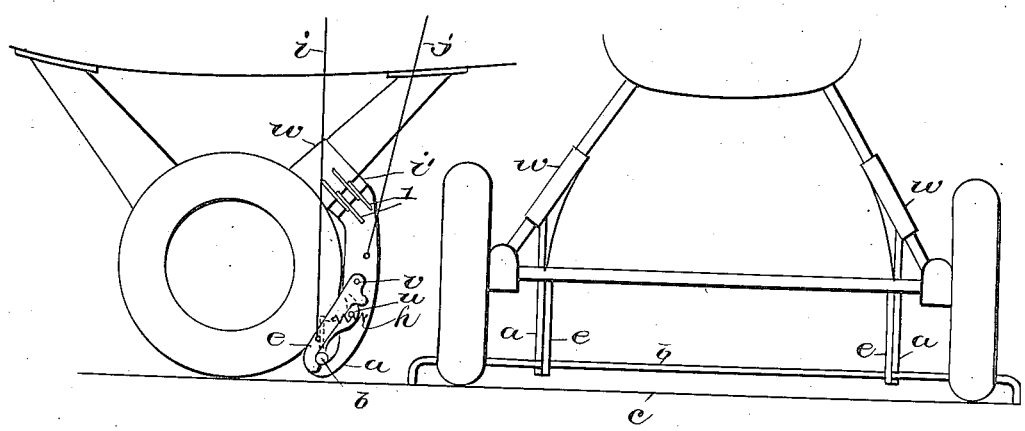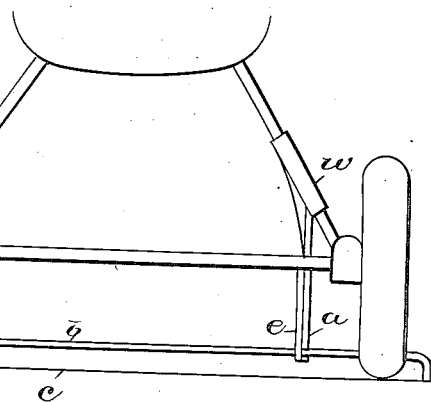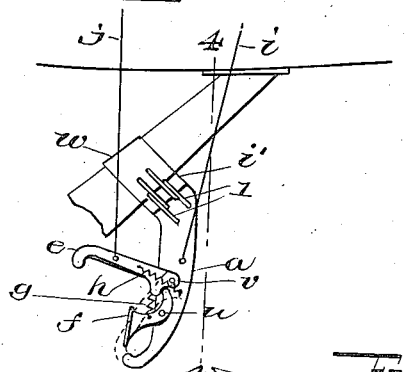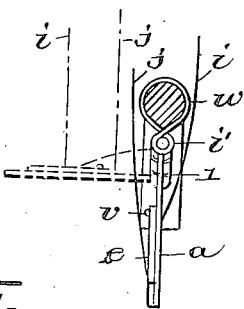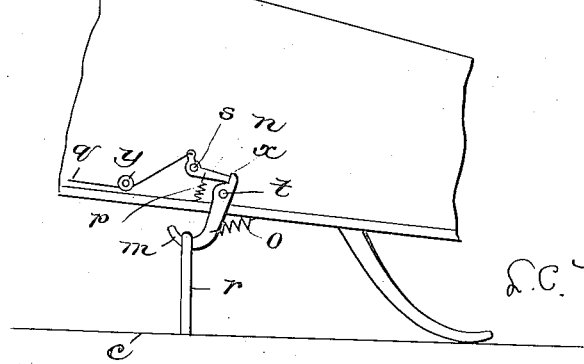

1,432,815

UNITED STATES PATENT OFFICE.

LOWELL C. WEINBERG, OF DAYTON, OHIO.

DEVICE FOR LANDING AND RETAINING AIRPLANES.

Application filed June 29, 1921. Serial No. 481,379.

*To all whom it may concern:*

Be it known that I, LOWELL C. WEINBERG, citizen of the United States, residing at Dayton, in the county of Montgomery and State of Ohio, have invented certain new and useful Improvements in Devices for Landing and Retaining Airplanes, of which the following is a specification.

This invention relates in general to landing devices for aircraft and more particularly to such a device, whereby the forward progress of an aircraft, when landing, may be positively and immediately arrested.

It is proposed to provide an attachment for aircraft landing gears whereby an aircraft may be easily landed and retained upon a large moving craft such as a dirigible or ocean liner. In either case, it is of military value to carry small speedy convoy planes for protection, among other purposes. In case of a dirigible, a runway of rigid construction may be provided on its top surface and a small horizontal bar slightly raised for the purpose of engaging the retaining means attached to the small aircraft.

It is also proposed to arrange such retaining means that the pilot may land in the convoy plane on the dirigible, have the ship automatically thus retained, descend into the dirigible cabin, return to the convoy plane, release his plane by the operation of levers within the cockpit, and take off free of the dirigible.

With the foregoing and other objects in view, which will appear as the description proceeds, the invention resides in the combination of parts and in the details of construction hereinafter described and claimed, it being understood that changes in the precise embodiment of the invention herein disclosed may be made within the scope of what is claimed, without departing from the spirit of the invention, the specific embodiments of which are illustrated in the attached drawings, in which—

Fig. 1 is a view in side elevation of part of a landing gear showing a wheel and the retaining device attached to the rear landing gear strut, showing the retaining device in engagement with a rod.

Fig. 2 is a view in front elevation of a landing gear showing a retaining device attached to each rear landing gear strut, the retaining device being engaged with a horizontal bar.

Fig. 3 is detail view in side elevation of the retaining device as attached to a strut, the retaining device being in unengaged position.

Fig. 4 is a section along 4—4 of Fig. 3 showing, in dotted lines, the retaining device rotated about its hinge in inoperative position.

Fig. 5 is a view in side elevation partly broken away of the rear end of the fuselage of an aircraft, showing the application of the retaining device to such a portion of the aircraft.

Referring more particularly to the drawings, hook $a$ is provided on the rear landing gear strut of the small aircraft on each side for engagement with a horizontally extending bar $b$ supported slightly above the platform $c$ secured on the top surface of the dirigible or other carrying vehicle. Rod $b$ is arranged sufficiently low in position with respect to the platform, that the landing wheels may ride over it without perceptible shock or rebound which would prevent engagement of the hooks $a$ with the rod $b$. A locking member $e$ is pivoted to the hook $a$ at $v$ and is adapted to be moved into the closed and engaged position as indicated in dotted lines in Fig. 3, by the action of the tension spring $h$.

A trigger $f$ pivoted at $u$ is normally held in operative position, holding the locking member $e$ in the fully opened position by spring $g$. This trigger $f$ is adapted to be tripped by contact with the securing rod $b$ on the balloon when the latter becomes engaged with the hook. The locking member is thus automatically operated, but is adapted to be manually reset in open position to release the plane by pulling the cord $i$ which extends from the locking member to the pilot's cockpit (not shown).

The hook $a$ is hinged at $i'$ to a bracket $w$ on the landing gear strut. A spring $l$ normally maintains the hook in its depending, operative position, but it may be readily moved into an elevated position to clear land obstructions, when it is desired to leave the ground, by pulling on the cord $j$ (see Fig 3). When it is desired to take off while on the larger craft, the smaller craft is moved rearwardly a few inches after opening the hooks, and then the latter are pulled up into inoperative position and the plane is free to take off.

The tail of the ship may be secured to the platform by means of a hook $m$, pivoted at $t$, and adapted to engage a cord $r$, attached to the platform $c$. A trip arm $n$ pivoted at $s$ is adapted to engage the projection $x$ of the hook $m$, and is held in such position by a tension spring $p$. This holds the hook $m$ in operative position against the tension of the spring $o$, as shown in Fig. 5. To release the hook member $m$ from the cord $r$ it is only necessary to pull the cable $q$, which extends to the cockpit (not shown). The pull on the cable $q$ around the pulley $y$ will release the trip arm $n$ from the hook $m$, which will be drawn, by the action of the tension spring $o$, from engagement with the cord $r$, said hook $m$ returning to an inoperative position, within the fuselage.

The retaining device is so applied to the wheels that their being far enough back, there will be no danger of nosing over.

I claim,

1. An aeroplane landing gear, a trigger operated hook member attached to said landing gear, a platform, a transverse bar arranged above the surface of said platform, said hook member being adapted to engage said bar for the purpose of arresting the forward progress of an aircraft when landing.

2. An aeroplane landing gear, a trigger operated hook member attached to said landing gear, a relatively stationary platform having a horizontal bar attached thereto in a position above the surface of said platform and adapted to be engaged by said hook member, said hook member being adapted to be swung into and out of operative position.

3. In an aircraft landing gear, a hook member attached thereto, said hook member comprising a hook arm and a spring operated hook arm pivotally mounted thereon, a trigger member pivotally mounted on said first named hook arm, and adapted to engage said second named hook arm to maintain said hook member in unengaged position, said second named hook arm being adapted to close when said trigger member is released, said entire hook member being hinged at its connection with said landing gear, and means operable at the will of the pilot for swinging said hook member into and out of operative position.

4. For use in an aircraft, a landing gear and a fuselage, a platform therefor, said platform being provided with an elevated transverse bar and a loop member, a plurality of trigger operated hook members attached to said landing gear and adapted to engage said transverse bar, a hook member attached to said fuselage and adapted to engage said loop member, for the purpose of retaining said aircraft.

5. For use in an aircraft, a landing gear and a fuselage, a platform therefor, said platform being provided with an elevated transverse bar and a loop member, a plurality of trigger operated hook members attached to said landing gear and adapted to engage said transverse bar, a hook member attached to said fuselage and adapted to engage said loop member, and means operable at the will of the pilot for disengaging said fuselage hook member from said loop.

6. For use in an aircraft, a landing gear and a fuselage, a platform therefor, said platform being provided with an elevated transverse bar and a loop member, a plurality of trigger operated hook members attached to said landing gear and adapted to engage said transverse bar, a hook member attached to said fuselage and adapted to engage said loop member, said fuselage hook member comprising a hook pivotally mounted on said fuselage, and adapted to be held in operative position by a trip arm, and means operable at the will of the pilot for disengaging said trip arm and releasing said fuselage hook member from said loop.

In testimony whereof I have affixed my signature.

LOWELL C. WEINBERG.